No. 645,008. Patented Mar. 6, 1900.
L. C. REED.
PROTECTIVE SYSTEM OF ELECTRIC DISTRIBUTION.
(Application filed July 17, 1899.)
(No Model.) 2 Sheets—Sheet 2.
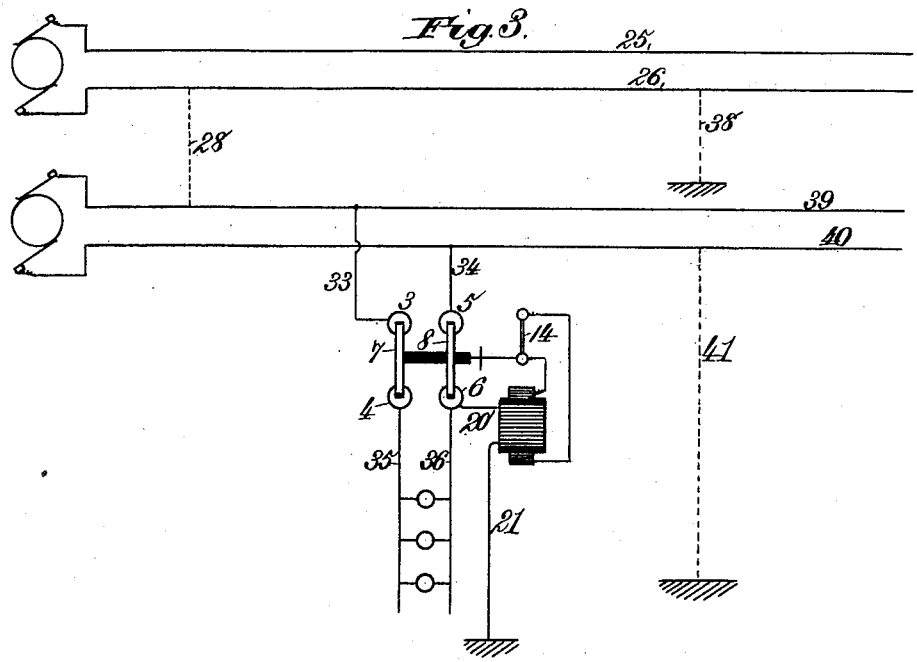
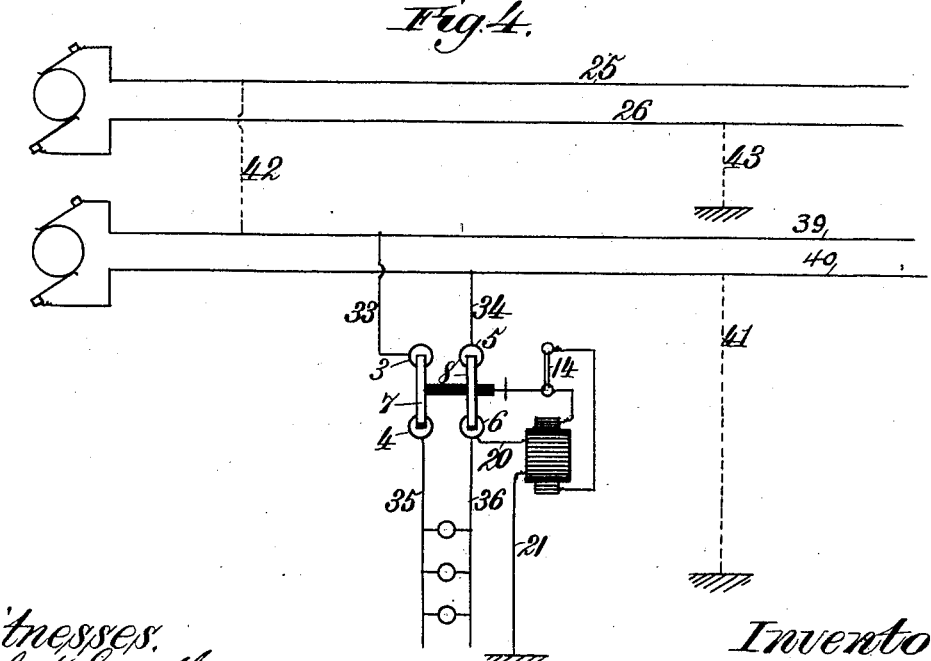
Witnesses.
Robert Everett
Inventor:
Lyman C. Reed.
By James L. Norris.
Atty.

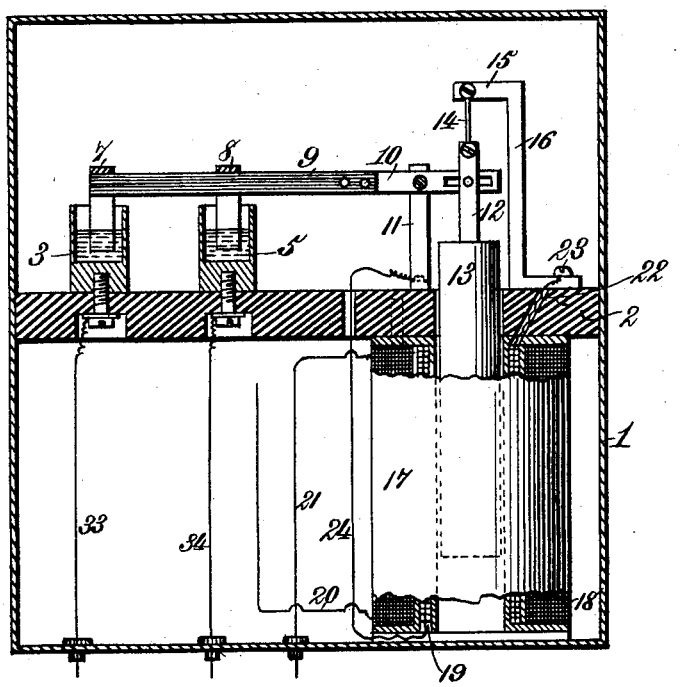

UNITED STATES PATENT OFFICE.

LYMAN C. REED, OF NEW ORLEANS, LOUISIANA.

PROTECTIVE SYSTEM OF ELECTRIC DISTRIBUTION.

SPECIFICATION forming part of Letters Patent No. 645,008, dated March 6, 1900.

Application filed July 17, 1899. Serial No. 724,067. (No model.)

*To all whom it may concern:*

Be it known that I, LYMAN C. REED, a citizen of the United States, residing at New Orleans, in the parish of Orleans and State of Louisiana, have invented new and useful Improvements in Protective Systems of Electrical Distribution, of which the following is a specification.

In an application for patent, Serial No. 724,066, filed by me of even date herewith, I have disclosed certain improvements in the three-wire low-tension system of electrical distribution, whereby absolute protection is obtained against the disastrous effects of high-tension currents. I have also disclosed in said application an improved construction of circuit-breaker to be used in connection with said system.

The improvement in the system consists in grounding the neutral wire thereof through the circuit-breaker, so that in the event of a high-tension cross the circuit-breaker will be automatically operated to cut out the ground and the house circuit. The circuit-breaker itself is designed to act with a high-tension current, either alternating or direct, and comprises a switch through which the service-circuit passes, a solenoid-transformer for operating the switch, and a grounded circuit through the primary of the solenoid-transformer, which is connected with the neutral wire of the service-circuit through said switch. My present invention has in view corresponding improvements upon a two-wire distribution system, as will be more fully hereinafter described and claimed.

In the drawings forming part of this specification, Figure 1 is a sectional elevation of the circuit-breaker employed, and Figs. 2, 3, and 4 are diagrammatic views illustrative of the system and the application of the circuit-breaker thereto.

Like reference-numerals indicate like parts in the different views.

The circuit-breaker is substantially the same as that disclosed in the former application referred to, except that it is adapted to the two-wire system of distribution instead of the three-wire system. The operative parts of the circuit-breaker are mounted in a weatherproof box or casing 1, having a bed-plate 2, of insulating material therein, as clearly shown in Fig. 1 of the drawings. To the bed-plate 2 are secured mercury-cups 3, 4, 5, and 6, with which coöperate the contact-strips 7 8, which bridge across and close the circuit between the cups 3 and 4 and 5 and 6, respectively. The contact-strips 7 and 8 are secured to a bar 9, of insulating material, which is itself attached at its rear end to a lever 10, of conducting material, fulcrumed at a point intermediate its ends to a support 11, of conducting material, and operatively connected with the stem 12 of a soft-iron core 13. The core 13 is normally held in its raised position, closing the switch, by means of a fuse 14, which is attached to the stem 12 and to an overhanging arm 15 of a metallic support or bracket 16. The core 13 fits within and is operated by a "solenoid-transformer" 17, which term is used for convenience to indicate a device which operates as an ordinary solenoid with a direct current and as a transformer with an alternating current. The same is made up of a primary coil 18 and a secondary coil 19, located in inductive relation to each other and separated by layers of suitable insulating material. The primary 18 is in a grounded circuit leading from the cup 6 through the wire 20 and to ground through the wire 21, which extends down through the bottom of the casing 1. The secondary 19 is in a normally-closed circuit, including the wire 22, which extends from one end of the coil to the screw or binding-post 23 on the bracket 16, and the wire 24, support 11, lever 10, core 12, fuse 14, and bracket 16. As thus constructed it will be observed that upon the passage of a high-tension direct current through the primary 18 of the solenoid-transformer the device acts magnetically upon the core 13, drawing the same downward, breaking the fuse 14 mechanically, depressing the rear end of the lever 10, and elevating the opposite end of said lever which carries the bar 9 and the contact-strips 7 and 8, breaking the circuit between the cups 3 and 4 and 5 and 6. With an alternating current of high potential the device acts as a transformer, a current of low potential, but high amperage, being induced in the closed circuit through the secondary 19, which induced current acts to melt the fuse 14 electrically, breaking the circuit between the cups 3 and 4 and 5 and 6, as before. By reason of the inefficient character of the device as a transformer a portion of the energy through the primary 18 will remain untransformed, and this will act magnetically to draw down the core 13 after the fuse 14 has been melted by the induced current through the secondary 19. The weight of the core 13 will also add its force to that of the electric current to accelerate the action of opening the switch.

As above stated, the circuit-breaker described is in all respects identical as that disclosed in the former application referred to and all of the details of construction and operation need not be specifically set forth herein, especially as no claim is based on said circuit-breaker in this application. From the foregoing, however, it will be apparent that the device will operate to immediately open the switch upon the passage of the high-tension current, either direct or alternating, through the primary winding of the solenoid-transformer.

In Fig. 2 of the drawings my improved circuit-breaker is shown applied. In this figure are illustrated the high-tension transmission-mains 25 26, either alternating or direct current, having one leg thereof accidentally grounded at 27 and the opposite leg crossed, as at 28, with two-wire isolated low-tension alternating-service mains 29 30 fed from high-tension primaries 30 31 through transformer 32. The house-service wires 33 34 lead to the mercury-cups 3 and 5, respectively, and the wires 35 36 lead from the mercury-cups 4 and 6 to the lamps or other devices to be supplied. 37 represents an accidental ground at some point in the house. In this case the cross 28 causes a flow to ground through the primary of the solenoid-transformer, and the switch is actuated to open the house-circuit and cut out the ground, as above described.

Fig. 3 shows high-tension mains 25 26, either alternating or direct, accidentally grounded at 38 and crossed at 28 on the same leg which is grounded with two-wire low-tension distributing-mains 39 40, either alternating or direct, one leg of which is grounded, as at 41, at some point of distribution. In this case no flow of current can occur until the insulation on the other leg 25 breaks down. Until this happens, therefore, there is no flow of high-tension current through the house-wiring or through the solenoid-transformer, and consequently the switch does not open. When a ground on leg 25 does occur, the flow of current is from wire 26 to ground through 38 and through the earth to the ground which has occurred on 25. If this ground be of low resistance, the wires will either be burned in two or the circuit will be otherwise opened. If the ground on 25 and that through 38 be of high resistance, the current will divide itself according to the resistance of 38 and the combined resistance of cross 28, wire 33, the instrument, wire 21, ground 41, and all other parallel circuits between 28 and the earth, a portion passing through the instrument to ground and through the earth to the ground which occurred on 25 and another portion flowing to ground through 41, and thence through the earth to the ground on 25. That which passes through the instrument operates the switch.

In Fig. 4 the conditions vary in that the cross 42 and ground 43 on high-tension wires 25 and 26 are on opposite wires, and switch operates as described with reference to Fig. 2. In this case the circuit is as follows: wire 25, cross 42, wire 39, wire 33, the instrument, and wire 21 to ground and through the earth and the ground 43 to wire 26. In passing through the instrument the current operates to open the switch in the manner heretofore described.

It will of course be understood that with the two-wire system of distribution all of the grounds through the solenoid-transformers throughout the entire system must be made on the same leg of the system. Should the opposite legs of the system be grounded through the primaries of the solenoid-transformers, there would be a continued flow of current through these coils, and should there be instruments enough in parallel the current would be of sufficient volume on low tension to operate the transformers when alternating current is used.

While my improvements have been described above in connection with a two-wire system and in my former application, above referred to, in connection with a three-wire system of distribution, the same are applicable to and intended to be used with any and all systems of electrical distribution when one wire is to be grounded through the solenoid-transformer, care being taken that the same wire is grounded in each installation throughout the system.

Having now described my invention, what I claim as new, and desire to secure by Letters Patent, is—

1. In a two-wire system of electrical distribution, a circuit-breaker, a ground-circuit from one of the legs of said system, and a solenoid-transformer for throwing said circuit-breaker into operation, the primary of which is in said ground-circuit.

2. In a two-wire system of electrical distribution, a ground-circuit from one of the legs thereof, a circuit-breaker controlling said ground-circuit, and a solenoid-transformer for throwing said circuit-breaker into operation, the primary of which is in said ground-circuit.

3. In a two-wire system of electrical distribution having house-circuits leading therefrom, a circuit-breaker controlling each of said house-circuits, a ground-circuit from one leg of each of said house-circuits, and a solenoid-transformer for throwing said circuit-breaker into operation the primary of which is in said ground-circuit.

4. In a two-wire system of electrical distribution having house-circuits leading therefrom, a ground-circuit from one leg of each of said house-circuits, a circuit-breaker controlling said house and ground circuits, and a solenoid-transformer for throwing said circuit-breaker into operation, the primary of which is in said ground-circuit.

5. In a two-wire system of electrical distribution, a ground from one of the legs thereof, a circuit-breaker controlling the same, and a solenoid-transformer for throwing said circuit-breaker into operation.

6. In a two-wire system of electrical distribution, a house-circuit, a switch controlling the same, a solenoid-transformer for operating the switch, and a grounded circuit from one of the legs of the house-circuit through the primary of said transformer.

7. In a two-wire low-tension system of electrical distribution, a switch, and a solenoid-transformer adapted to open said switch, one leg of said system being grounded through said solenoid-transformer, whereby said switch will be actuated by a high-tension current to cut out the ground.

8. In a two-wire low-tension system of electrical distribution, a house-circuit, a switch in said house-circuit, and a solenoid-transformer adapted to open said switch, one leg of said house-circuit being grounded through said solenoid-transformer, whereby said switch will be actuated by a high-tension current to disconnect said house-circuit and cut out the ground.

In testimony whereof I have hereunto set my hand in presence of two subscribing witnesses.

LYMAN C. REED.

Witnesses:
  M. C. SONIAT,
  L. REESE VILLARS.